Oct. 20, 1936.    L. NASAREVICH    2,057,907
CONVERTIBLE AUTOMOBILE BODY
Filed Aug. 21, 1934    2 Sheets-Sheet 1
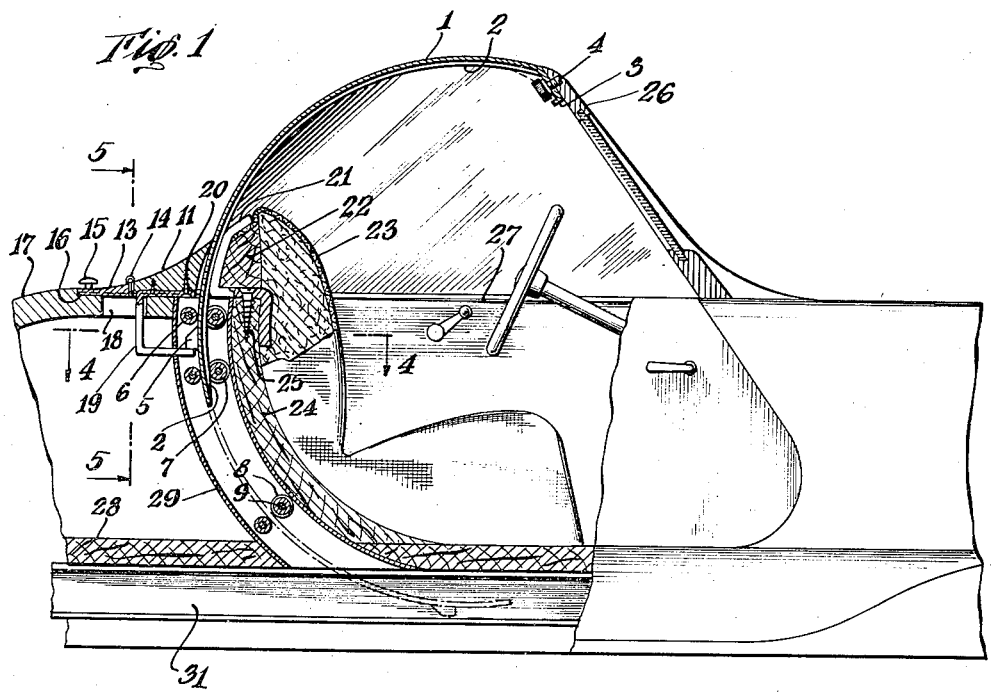
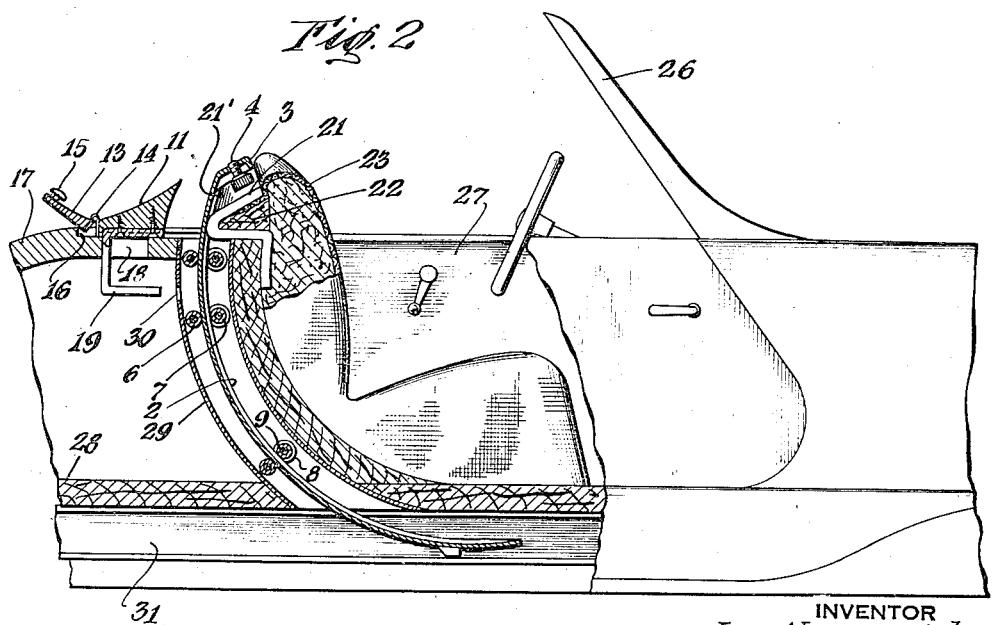
INVENTOR
Leo Nasarevich
BY Charles A. Morton
ATTORNEY Oct. 20, 1936.    L. NASAREVICH    2,057,907
CONVERTIBLE AUTOMOBILE BODY
Filed Aug. 21, 1934    2 Sheets-Sheet 2
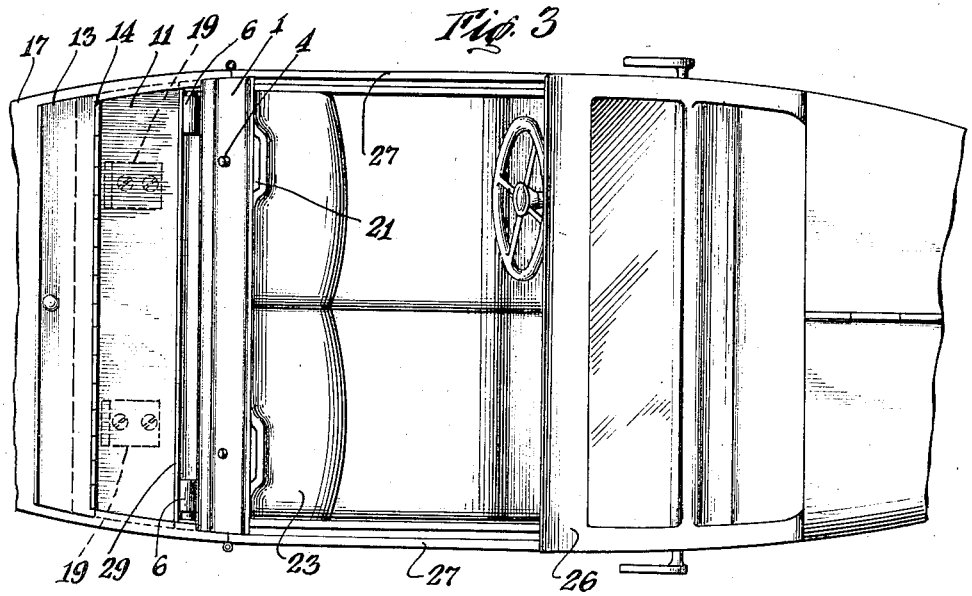
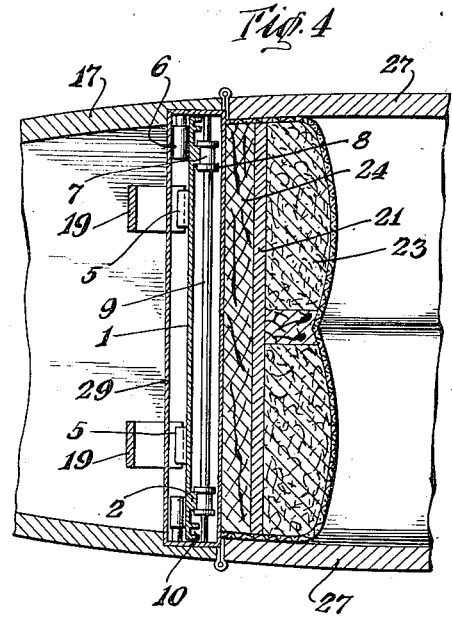
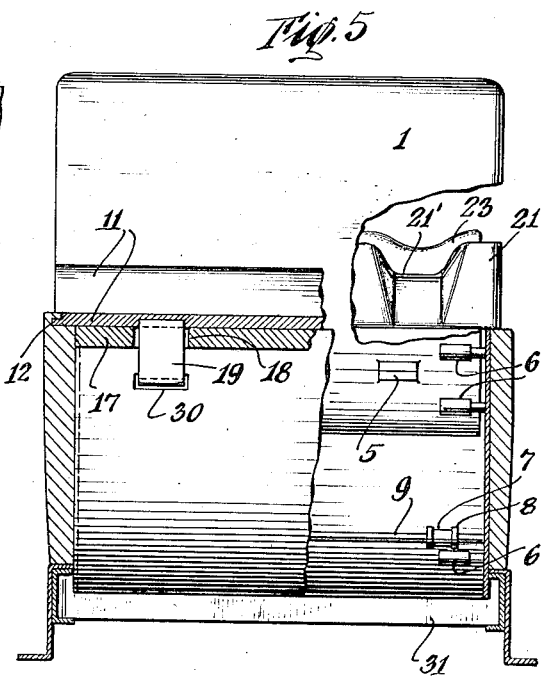
INVENTOR
Leo Nasarevich
BY
Charles A. Morton
ATTORNEY Patented Oct. 20, 1936

2,057,907

UNITED STATES PATENT OFFICE 2,057,907

CONVERTIBLE AUTOMOBILE BODY

Leo Nasarevich, Jackson Heights, N. Y.

Application August 21, 1934, Serial No. 740,782

1 Claim. (Cl. 296—107)

This invention relates to convertible automobile bodies, or automobile bodies of the combination open and closed type.

Heretofore automobile bodies of the combination type have been provided with tops made of pliable material, such as canvas and the like, having a comparatively short useful life, and incapable of effectively insulating the automobile interior against low temperatures.

One object of this invention is to increase the useful life of the collapsible automobile top.

Another object is the effective insulation against low temperatures of the interior of an automobile having a collapsible top.

Another object is an automobile top which can be readily opened or closed to quickly and simply convert the automobile from a closed to an open car or vice versa.

Other objects will appear from the detailed description.

In the drawings comprising two sheets of five figures numbered Figs. 1 to 5 inclusive:

Fig. 1 is a side view of an automobile body showing my invention partly in section, and with the top in raised position.

Fig. 2 is a side view of the body of Fig. 1 partly in section but with the top in collapsed position.

Fig. 3 is a plan view of the body of Fig. 1.

Fig. 4 is a horizontal sectional view taken along the line 4—4 of Fig. 1 looking in the direction of the arrows; and Fig. 5 is a vertical sectional view taken along the line 5—5 of Fig. 1 looking in the direction of the arrows.

Like reference characters designate corresponding parts throughout the several figures of the drawings.

The automobile body (including seat 23 and floor 28) is supported by framework 31 (Fig. 1). The back wall 24 of seat 23 may be made of, or sheathed with, metal, forming a substantially sector shaped wall. The rear compartment which may contain a rumble seat (not shown) is enclosed between top wall 17 and the sector shaped partition wall 29. Walls 24 and 29 are positioned in concentric spaced relation to form a sector shaped compartment behind seat 23 for housing the curved rigid top 1 (Fig. 2). Top 1 may be of metal and may define a sector of a cylinder. It is adapted to be raised from and lowered into the compartment of similar curvature forming a housing therefor, between the rollers 6 and 7, which are covered with a yielding surface of rubber or the like 8, to avoid marking the top 1. The top 1 is provided with a suitable curved channelled weather stripping 10 (Fig. 4) conforming to the contour of said top and adapted to engage the upper edges of the side windows when the same are raised out of the door frames 27. Rollers 7 are rotatably mounted on suitable spindles 9 (Fig. 4) and co-act with guide ribs 2 formed upon the inner face of top 1, and the rollers 6 are likewise rotatably mounted to bear against the surface of top 1. In the lowered position of top 1, its forward edge 3 may be concealed behind the upholstered back cushion of seat 23, the upholstering being recessed and protected by a metal hand guard 21 (Fig. 3), to afford access to the forward edge 3 of the top 1, and thus facilitate raising and lowering the same. The trailing edge of top 1 is bevelled (Figs. 1 and 2), to facilitate its passage between the rollers 6 and 7, and the forward edge of said top is provided with a plurality of knurled bolts 4, adapted to register with threaded openings in the top framework of the windshield 26 to secure the top in open position. The top is further supported when in open position by the U shaped members 19, which are adapted to slide through the openings 30—30 and partition wall 29 to engage the underside of the lugs 5—5 secured to the trailing edge of top 1 (see Figs. 1, 4, and 5).

The compartment formed between back wall 24 and partition wall 29 for housing top 1 may be used for draining off rain water and moisture, or said compartment may be closed to keep out moisture by means of a suitable sliding closure 11 bearing against the top 1 in open position (Fig. 1) so as to divert rain water over the top wall 17. The U shaped members 19 are secured to the underside of closure 11 by means of suitable screws 20, and to retain closure 11 in locked position, top wall 17 is recessed to form a shoulder 16 for the hinged extension 13 of closure 11, said extension being hinged at 14, to facilitate disengagement with shoulder 16 when the extension 13 is lifted by means of the hand grip 15. When extension 13 is disengaged from shoulder 16, closure 11 may be retracted rearwardly (Fig. 2), the top wall 17 being provided with suitable openings 18 defining guideways, wherein the U shaped members 19 are free to slide by way of openings 30 into and out of engagement with the lugs 5.

The side openings between the windshield 26 and the top 1, and above the doors 27, may be enclosed by means of suitable sliding glass panels housed in recesses formed in the doors 27 in accordance with well known practice.

Operation

To collapse the top the side windows are first lowered into the door frames 27, and the knurled bolts 4—4 are unscrewed to disengage the framework of the windshield 26. Extension 13 is then lifted by means of hand grip 15, and closure 11 retracted rearwardly to disengage the U shaped members 19 from the lugs 5. The top 1 is then lowered until completely housed in the compartment formed between back wall 24 and partition wall 29, the rollers 6 and 7 and guide ribs 2, serving to guide top 1 until the same comes to rest in the position indicated in Fig. 2.

To raise the top the procedure is reversed. Top 1 is grasped at its forward edge 3 and then drawn upwards until the lugs 5 engage U shaped members 19, when closure 11 is moved to the forward position shown in Fig. 1, at which time extension 13 engages against shoulder 16 of top wall 17, to prevent closure 11 from releasing. The knurled bolts 4 are now screwed into the recesses in the framework of windshield 26, and the side windows are raised until the same are engaged inside the channelled weather stripping 10 of top 1, when the car is completely enclosed.

What is claimed is:

In a convertible automobile body and in combination a sector shaped compartment extending across the body behind and beneath the seats, a one-piece rigid metal top defining a sector of the surface of a cylinder extending across the body and from the upper end of the windshield rearwardly to said compartment, said compartment forming a housing for said top, spindles mounted within said compartment, channelled rollers rotatably mounted on said spindles, reinforcing ribs secured to the underside of said metal top and engaging said roller channels to guide said top for movement into and out of said compartment, the forward edge of said top in extended position being supported by the upper edge of the windshield, said top being otherwise rigid and self-supporting, means to lock the forward edge of said top to the upper edge of the windshield, said top when extended forming in conjunction with said windshield the front and rear walls, and roof, of said body and defining the open framework of the body sides, said framework openings being entirely clear of any obstruction which might tend to restrict freedom of access to or egress from the body seat, body sides, one for each framework opening, said sides being hollow to form window housings, and windows, one for each of said sides, said windows being slidably operable into and out of said housings to cooperate with said sides, said windshield, and said top when extended, to complete conversion from an open to a closed body, said body sides being hingedly mounted in said framework openings to provide doors for said convertible body.

LEO NASAREVICH.